(12) United States Patent
Li et al.

(10) Patent No.: US 10,347,969 B2
(45) Date of Patent: Jul. 9, 2019

(54) MOBILE TERMINAL WITH AN ANTENNA HAVING MULTIPLE RADIATORS

(71) Applicant: Huawei Technologies Co., Ltd., Shenzhen (CN)

(72) Inventors: Yuanpeng Li, Beijing (CN); Yafang Yu, Beijing (CN); Hanyang Wang, Reading (GB); Jianming Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 15/326,678

(22) PCT Filed: Jul. 31, 2014

(86) PCT No.: PCT/CN2014/083425
§ 371 (c)(1),
(2) Date: Jan. 17, 2017

(87) PCT Pub. No.: WO2016/015284
PCT Pub. Date: Feb. 4, 2016

(65) Prior Publication Data
US 2017/0207515 A1    Jul. 20, 2017

(51) Int. Cl.
*H01Q 1/24* (2006.01)
*H01Q 1/44* (2006.01)
(Continued)

(52) U.S. Cl.
CPC ............... *H01Q 1/243* (2013.01); *H01Q 1/38* (2013.01); *H01Q 1/44* (2013.01); *H01Q 1/48* (2013.01);
(Continued)

(58) Field of Classification Search
CPC ........ H01Q 1/243; H01Q 1/38; H01Q 9/0421; H01Q 1/42; H01Q 1/12
(Continued)

(56) References Cited

U.S. PATENT DOCUMENTS 8,532,697 B2    9/2013    Pascolini
2004/0222928 A1    11/2004    Chen
(Continued)

FOREIGN PATENT DOCUMENTS

| CN | 101710644 A | 5/2010 |
| CN | 102738556 A | 10/2012 |

(Continued)

OTHER PUBLICATIONS

Machine Translation and Abstract of Japanese Publication No. JP2003133846, May 9, 2003, 8 pages.
(Continued)

*Primary Examiner* — Dameon E Levi
*Assistant Examiner* — Collin Dawkins
(74) *Attorney, Agent, or Firm* — Conley Rose, P.C.

(57) ABSTRACT

A mobile terminal, where the mobile terminal includes an antenna, where the antenna includes a first radiator, a second radiator that forms an electrical connection with the first radiator, a first ground branch that forms a coupling part with one end of the first radiator, and a second ground branch that forms another coupling part with the other end of the first radiator, where the first radiator, the first ground branch, and the second ground branch form an outer frame of the mobile terminal, the second radiator encircles in an inner side of the outer frame formed by the first radiator, the first ground branch, and the second ground branch, and the first radiator and the second radiator generate resonances in different frequency bands.

20 Claims, 5 Drawing Sheets

(51) Int. Cl.
  *H01Q 1/38* (2006.01)
  *H01Q 9/42* (2006.01)
  *H01Q 5/371* (2015.01)
  *H01Q 5/378* (2015.01)
  *H01Q 5/30* (2015.01)
  *H01Q 1/48* (2006.01)
  *H04B 1/3827* (2015.01)

(52) U.S. Cl.
  CPC .............. *H01Q 5/30* (2015.01); *H01Q 5/371* (2015.01); *H01Q 5/378* (2015.01); *H01Q 9/42* (2013.01); *H04B 1/3827* (2013.01)

(58) Field of Classification Search
  USPC ........................................ 343/702, 872, 878
  See application file for complete search history.

(56) References Cited

U.S. PATENT DOCUMENTS

| | | | | |
|---|---|---|---|---|
| 2014/0218247 | A1* | 8/2014 | Tefiku | H01Q 5/321 343/752 |
| 2015/0255857 | A1* | 9/2015 | Kim | H01Q 1/243 343/702 |

FOREIGN PATENT DOCUMENTS

| | | | |
|---|---|---|---|
| CN | 103117452 | A | 5/2013 |
| CN | 103151601 | A | 6/2013 |
| CN | 103346397 | A | 10/2013 |
| CN | 103579754 | A | 2/2014 |
| CN | 103579755 | A | 2/2014 |
| CN | 203674398 | U | 6/2014 |
| CN | 104300224 | A | 1/2015 |
| EP | 2500979 | A2 | 9/2012 |
| EP | 2511979 | A1 | 10/2012 |
| EP | 2733782 | A1 | 5/2014 |
| JP | 2003133846 | A | 5/2003 |

OTHER PUBLICATIONS

Foreign Communication From a Counterpart Application, Chinese Application No. 201480060595.8, Chinese Office Action dated Sep. 5, 2018, 8 pages.
Machine Translation and Abstract of Chinese Publication No. CN101710644, May 19, 2010, 11 pages.
Machine Translation and Abstract of Chinese Publication No. CN104300224, Jan. 21, 2015, 12 pages.
Machine Translation and Abstract of Chinese Publication No. CN203674398, Jun. 25, 2014, 7 pages.
Foreign Communication From a Counterpart Application, European Application No. 14898657.3, Extended European Search Report dated May 31, 2017, 10 pages.
Foreign Communication From a Counterpart Application, PCT Application No. PCT/CN2014/083425, English Translation of International Search Report dated Apr. 29, 2015, 2 pages.
Foreign Communication From a Counterpart Application, PCT Application No. PCT/CN2014/083425, English Translation of Written Opinion dated Apr. 29, 2015, 7 pages.
Rosu, I., et al., "PIFA—Planar Inverted F Antenna," XP055232908, Jan. 20, 2012, 4 pages.
Foreign Communication From a Counterpart Application, European Application No. 14898657.3, European Oral Proceedings dated Jan. 25, 2019, 10 pages.
Machine Translation and Abstract of Chinese Publication No. CN103579754, dated Feb. 12, 2014, 12 pages.
Machine Translation and Abstract of Chinese Publication No. CN103579755, dated Feb. 12, 2014, 13 pages.
Foreign Communication From a Counterpart Application, Chinese Application No. 201480060595.8, Chinese Notice of Allowance dated Mar. 12, 2019, 5 pages.

* cited by examiner

MOBILE TERMINAL WITH AN ANTENNA HAVING MULTIPLE RADIATORS

CROSS-REFERENCE TO RELATED APPLICATIONS

This application is a U.S. national stage of International Patent Application No. PCT/CN2014/083425 filed on Jul. 31, 2014, which is hereby incorporated by reference in its entirety.

TECHNICAL FIELD

Embodiments of the present disclosure relate to the field of communications technologies, and in particular, to a mobile terminal.

BACKGROUND

To meet a demand of a user for an appearance of a mobile terminal, generally a metal housing design solution is used for the mobile terminal. Therefore, a higher requirement is raised for an antenna technology of the mobile terminal. Further, in the mobile terminal using an all-metal antenna solution, an antenna is generally exposed. However, a signal of the antenna is degraded when a user touches the metal housing. To avoid the foregoing problem, in a mobile terminal in other approaches, for example, an antenna may be designed on a front surface of a mobile phone in order to keep away from a touch of a user. For another example, a dielectric such as a plastic cover may be added to an exterior of a radiation part of a metal antenna of the mobile phone in order to prevent a direct touch of a user.

SUMMARY

Embodiments of the present disclosure provide a mobile terminal, which resolves a problem in other approaches where a signal of an antenna in a mobile terminal with a metal housing is degraded due to a touch of a user.

According to a first aspect, an embodiment of the present disclosure provides a mobile terminal, where the mobile terminal includes an antenna, the antenna includes a first radiator, a second radiator that forms an electrical connection with the first radiator, a first ground branch that forms a coupling part with one end of the first radiator, and a second ground branch that forms another coupling part with the other end of the first radiator, where the first radiator, the first ground branch, and the second ground branch form an outer frame of the mobile terminal, the second radiator encircles an inner side of the outer frame formed by the first radiator, the first ground branch, and the second ground branch, and the first radiator and the second radiator generate resonances in different frequency bands.

In a first possible implementation manner of the first aspect, the first radiator operates in a normal operating frequency band when performing communication, the second radiator operates in a frequency band higher than the normal operating frequency band, and a frequency of the second radiator is shifted to the normal operating frequency band when a coupling part formed by the first radiator and one of the ground branches is touched by a user such that the second radiator takes the place of the first radiator to perform the communication.

According to the first aspect or the first possible implementation manner of the first aspect, in a second possible implementation manner, an electrical connection area between the first radiator and the second radiator forms a feeding part of the antenna, where the feeding part is a coupled feeder, a spacing between the first radiator and the second radiator is shorter than 1 millimeter, and a dielectric constant of a filling dielectric is between 2 and 6, or the feeding part is a direct feeder, a spacing between the first radiator and the second radiator is shorter than 1 millimeter, a dielectric constant of a filling dielectric is between 2 and 6, and the first radiator and the second radiator are directly connected.

According to any one of the first aspect and the first and the second possible implementation manners of the first aspect, in a third possible implementation manner, the antenna further includes a matching circuit that separately connects to the first radiator and the second radiator, where the matching circuit includes a capacitor and an inductor and is configured to adjust input impedance of the first radiator and the second radiator.

According to any one of the first aspect and the first to the third possible implementation manners of the first aspect, in a fourth possible implementation manner, the first radiator and the second radiator are parallel radiators.

According to the fourth possible implementation manner of the first aspect, in a fifth possible implementation manner, the mobile terminal further includes a metal rear cover and a mainboard, where a grounding surface is disposed on the mainboard, where the metal rear cover is connected to the grounding surface of the mainboard, and the first radiator and the second radiator are directly connected to the mainboard using the matching circuit.

According to the fifth possible implementation manner of the first aspect, in a sixth possible implementation manner, one end of the first ground branch and one end of the second ground branch are respectively connected to two sides of the metal rear cover, a nonmetallic material is separately filled between the first radiator and the first ground branch and between the first radiator and the second ground branch such that the metal rear cover, the first ground branch, the second ground branch, and the first radiator form an integrated metal housing of the mobile terminal.

According to the fifth or the sixth possible implementation manner of the first aspect, in a seventh possible implementation manner, the first radiator, the first ground branch, and the second ground branch are disposed at the top or bottom of the mobile terminal, and one end of the second radiator is close to an inner side of the metal rear cover or the grounding surface of the mainboard.

According to the mobile terminal provided in the embodiments of the present disclosure, a radiation part is configured as a first radiator and a second radiator that have resonances in different frequency bands, and ground branches that form coupling structures with the first radiator are respectively disposed at two ends of the first radiator, where the first radiator and the ground branches at the two ends form an outer frame of the mobile terminal, when an antenna in the structure is used in a mobile terminal with a metal housing and when the first radiator and the second radiator that have the resonances in different frequency bands are affected by a dielectric of a user, a frequency of the second radiator with a higher resonance frequency band may be actively shifted to a resonance frequency range of the first radiator and the second radiator takes the place of the first radiator to perform communication, thereby overcoming a problem in other approaches where a signal is degraded because an antenna of a mobile terminal is touched by a user, and correspondingly improving use performance of the antenna in the mobile terminal.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
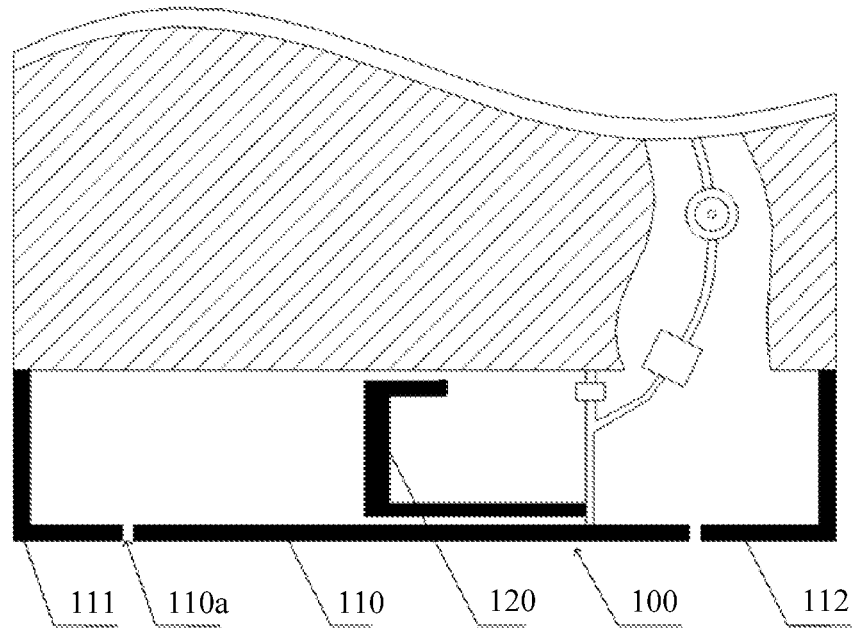
FIG. 1 is a schematic structural diagram of a mobile terminal according to an embodiment of the present disclosure.

FIG. 1 is a schematic structural diagram of a mobile terminal according to an embodiment of the present disclosure. As shown in FIG. 1, the mobile terminal provided in this embodiment includes an antenna 100, where the antenna 100 includes a first radiator 110, a second radiator 120 that forms an electrical connection with the first radiator 110, and a first ground branch 111 and a second ground branch 112 that form coupling parts 110a respectively with two ends of the first radiator 110. The first radiator 110, the first ground branch 111, and the second ground branch 112 form an outer frame of the mobile terminal, the second radiator 120 encircles in an inner side of the outer frame formed by the first radiator 110, the first ground branch 111, and the second ground branch 112, and the first radiator 110 and the second radiator 120 generate resonances in different frequency bands. In this embodiment, the electrical connection formed by the first radiator 110 and the second radiator 120 may be a direct connection or may be a coupled connection. This embodiment sets no limitation on a specific connection manner of the first radiator 110 and the second radiator 120. In addition, as shown in FIG. 1, the second radiator 120, for example, may be "J"-shaped and encircles in the inner side of the outer frame of the mobile terminal.

The mobile terminal provided in this embodiment may be a mobile phone with an all-metal housing. In the mobile terminal provided in this embodiment, the antenna 100 having the first radiator 110 and the second radiator 120 may cover a relatively wide range of a long term evolution (LTE) network frequency band, and its frequency band coverage may be between 791 megahertz (MHz) and 960 MHz and between 1710 MHz and 2690 MHz. For example, a frequency band from 791 MHz to 960 MHz is covered by respective low frequency resonances of the first radiator 110 and the second radiator 120. A frequency band from 1710 MHz to 2690 MHz is covered by the first high frequency resonance and a second high frequency resonance. The first high frequency resonance is generated by coupling between the second radiator 120 and the metal housing of the mobile phone, and the second high frequency resonance is generated by frequency multiplication of the first radiator 110. Therefore, the two radiators of the antenna 100 can cover frequency bands between 791 MHz and 960 MHz and between 1710 MHz and 2690 MHz, and coverage of an operating frequency band of an antenna in the mobile phone is expanded as compared with that in other approaches.

Figure 2:
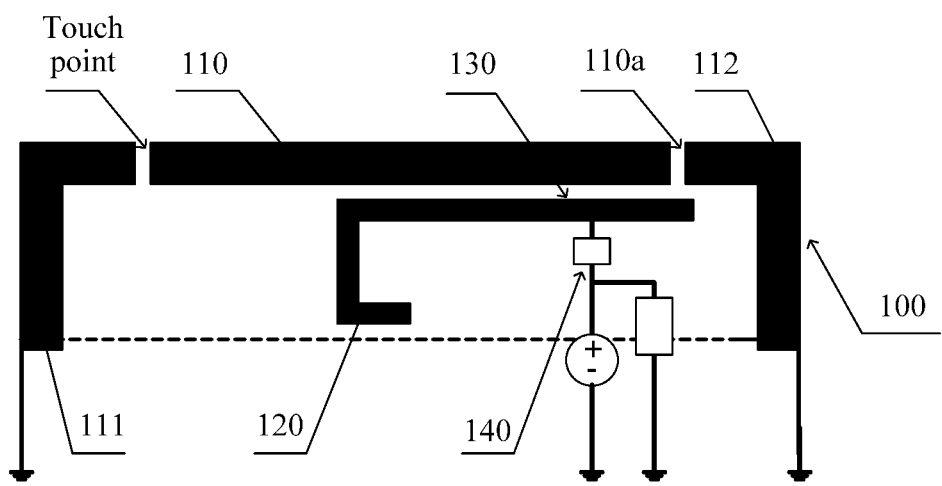
FIG. 2 is a schematic diagram of an antenna when a user touches the mobile terminal according to the embodiment shown in FIG. 1.

Currently, on a commonly-used mobile phone, when a user touches a gap between a radiator of an antenna and a ground branch, antenna performance is deteriorated, and use of the mobile phone is affected. FIG. 2 shows a schematic diagram of an antenna when a user touches the mobile terminal according to the embodiment shown in FIG. 1. In the mobile terminal provided in this embodiment, because an outer frame of the mobile terminal constitutes a main radiator of an antenna 100, that is, a first radiator 110 and a second radiator 120 that may generate resonances in different frequency bands, in specific implementation, a radiator that may be easily touched by the user, that is, the first radiator 110 that is used to constitute the outer frame of the mobile terminal, may be used as the main radiator when communication is performed, and a frequency of the resonance generated by the first radiator 110 is controlled within a normal operating low frequency band such that a frequency of the resonance generated by the second radiator 120 is higher than the frequency of the resonance generated by the first radiator 110, for example, may be in a relatively high operating frequency band that is engaged in communication work, or may be in a high frequency band that is not engaged in communication work. In specific implementation, electrical lengths of the first radiator 110 and the second radiator 120 may be adjusted to control operating wavelengths corresponding to the two radiators. The electrical length of the second radiator 120, for example, may be greater than or equal to ⅛ of the electrical length of the first radiator 110. With control over the electrical lengths of the two radiators, it is implemented that the two radiators have different resonance frequencies.

Figure 3:
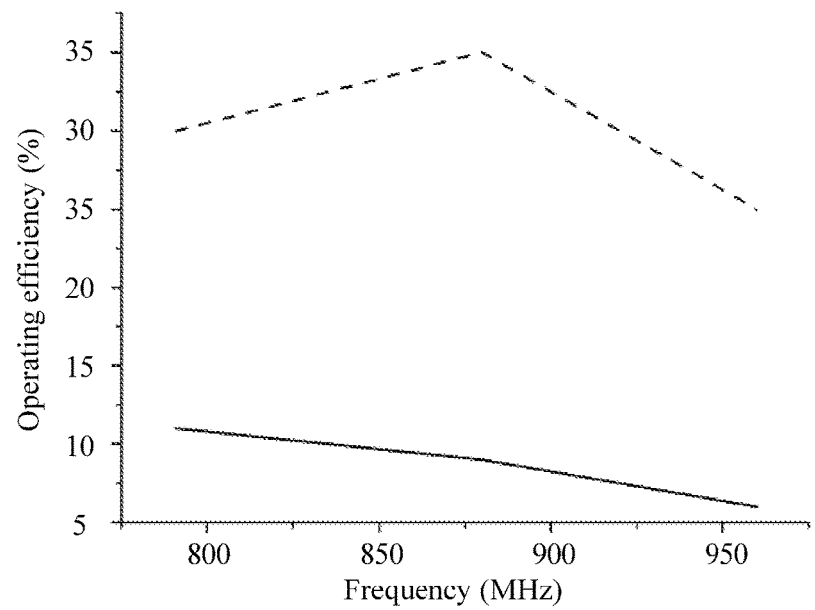
FIG. 3 is a schematic diagram of a relationship between a resonance frequency and operating efficiency of an antenna in the mobile terminal according to the embodiment shown in FIG. 1.

It can be understood that when a user touches a gap between the first radiator 110 and one of the ground branches, that is, a coupling part 110a formed by the first radiator 110 and one of the ground branches such as a first ground branch 111 or a second ground branch 112, a resonance frequency of the first radiator 110 is shifted to a lower frequency due to impact of a dielectric of a human body, and performance of the first radiator 110 is deteriorated. Similarly, a resonance frequency of the second radiator 120 is also shifted to a lower frequency when the second radiator 120 is affected by the dielectric of the human body. In addition, according to theoretical and experimental experience, impact on a resonance frequency of the antenna is approximately the same when different users touch the foregoing coupling part 110a. For example, a resonance frequency of the first radiator 110 is 810 MHz when nobody touches the coupling part 110a. After a first person touches the coupling part 110a, the resonance frequency of the first radiator 110 is shifted to 700 MHz, and after a second person touches the coupling part 110a, the resonance frequency of the first radiator 110 is shifted to 705 MHz. In this embodiment of the present disclosure, with control over a resonance frequency of the second radiator 120 during normal operation, when a user touches the gap between the first radiator 110 and one of the ground branches, a resonance frequency of the second radiator 120 is shifted lower to a normal operating frequency band of the first radiator 110 such that the second radiator 120 takes the place of the first radiator 110 to perform communication. It should be noted that the normal operation described herein all refers to when no user touches the coupling part 110a of the mobile terminal. Therefore, in the mobile terminal provided in this embodiment, when its antenna 100 is touched by a user, the antenna 100 as a whole can still implement a radiation function. FIG. 3 shows a schematic diagram of a relationship between a resonance frequency and operating efficiency of an antenna in the mobile terminal according to the embodiment shown in FIG. 1. A solid line is a relationship between a resonance frequency and operating efficiency of an antenna provided in other approaches after the antenna is affected by a dielectric of a human body, and a dashed line is a relationship between a resonance frequency and operating efficiency of an antenna 100 according to an embodiment of the present disclosure after the antenna 100 is affected by the dielectric of the human body, where the antenna 100 includes a first radiator 110 and a second radiator 120. Because the second radiator 120 is added to the antenna 100 in the mobile terminal provided in this embodiment, after the first radiator 110 is affected by the dielectric of the human body, the added second radiator 120 still has relatively high operating efficiency and can meet a radiation requirement of the antenna 100. Therefore, the antenna 100 of the mobile terminal provided in this embodiment can ensure that the operating efficiency meets a communication demand when affected by the dielectric of the human body. In addition, a shape and an appearance of a metal housing of the mobile terminal provided in this embodiment does not need to be changed when the appearance design of the all-metal housing is used.

According to the mobile terminal provided in this embodiment, a radiation part is configured as a first radiator 110 and a second radiator 120 that have resonances in different frequency bands, ground branches 111 and 112 that form coupling structures 110a with the first radiator 110 are respectively disposed at two ends of the first radiator 110, where the first radiator 110 and the ground branches 111 and 112 at the two ends form an outer frame of the mobile terminal. A frequency of the second radiator 120 with a higher resonance frequency is shifted to a resonance frequency range of the first radiator 110 when the antenna 100 in the structure is used in a mobile terminal with a metal housing and when the first radiator 110 and the second radiator 120 that have the resonances in different frequency bands are affected by a dielectric of a user, and the second radiator 120 takes the place of the first radiator 110 to perform communication, thereby overcoming a problem in other approaches that a signal is degraded because an antenna of a mobile terminal is touched by a user, and correspondingly improving use performance of the antenna in the mobile terminal.

It should be noted that, in specific implementation of this embodiment, as shown in FIG. 2, the first radiator 110 is not directly connected to a first ground branch 111 and a second ground branch 112 that are disposed at two ends of the first radiator 110, but forms coupling parts 110a separately with the first ground branch 111 and the second ground branch 112, that is, there are separately a gap between the first radiator 110 and the first ground branch 111 and a gap between the first radiator 110 and the second ground branch 112. In addition, an electrical connection area between the first radiator 110 and the second radiator 120 forms a feeding part 130 of the antenna.

In another possible implementation manner of this embodiment, when the mobile terminal provided in this embodiment is applied in high frequency communication, the antenna 100 of the mobile terminal needs to perform radiation on a high frequency signal, and can also achieve a use effect in the foregoing embodiment. Further, the first radiator 110 may operate in a high frequency band, for example, a frequency band of a Wi-Fi network or the Global Positioning System (GPS). Correspondingly, the second radiator 120 operates in a frequency band higher than the normal operating frequency band of the first radiator 110, and when a user touches a coupling part 110a of an outer frame formed by the first radiator 110 of the antenna 100, the frequency of the second radiator 120 may also be shifted to a frequency band used by the Wi-Fi or the GPS. A design solution of the antenna in the mobile terminal provided in this embodiment has universal applicability, provided that the operating frequency band of the second radiator 120 is controlled to be higher than the operating frequency band of the first radiator 110 and it is ensured that, when the antenna is touched by the user, the operating frequency band of the second radiator 120 may be reduced to be a frequency band of the first radiator 110 during normal operation.

Figure 4:
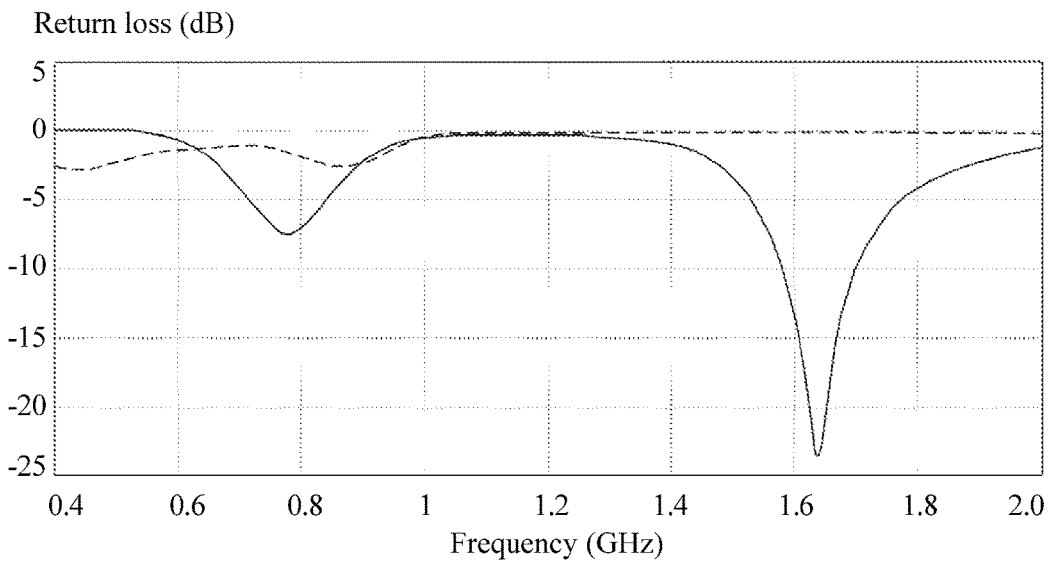
FIG. 4 is a schematic diagram of radiation of an antenna.
Figure 5:
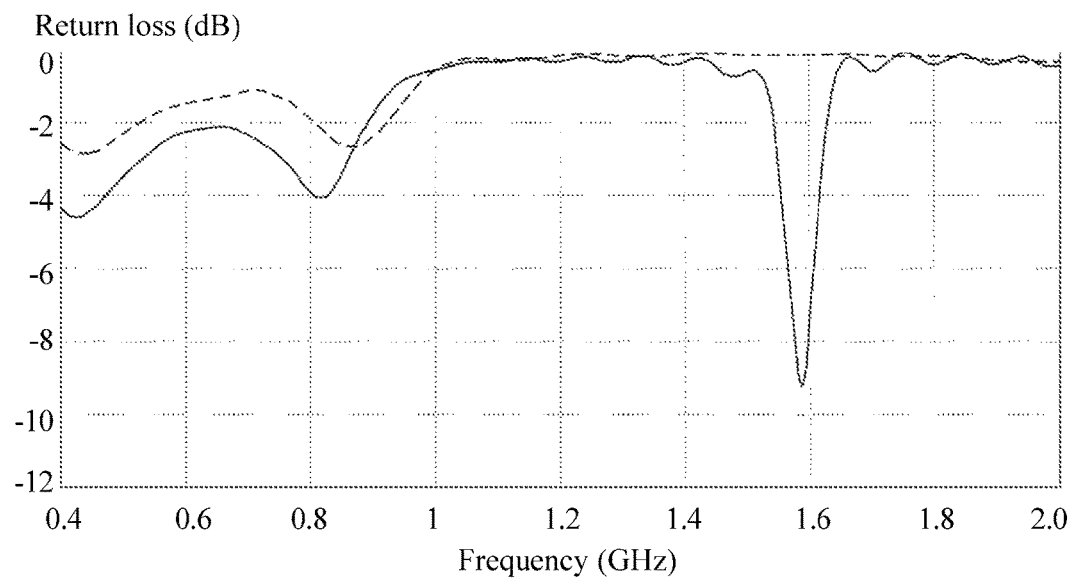
FIG. 5 is a schematic diagram of radiation of an antenna in a mobile terminal according to an embodiment of the present disclosure.

For example, for description, FIG. 4 is a schematic diagram of radiation of an antenna in other approaches, and FIG. 5 is a schematic diagram of radiation of an antenna in a mobile terminal according to an embodiment of the present disclosure. As shown in FIG. 4, a solid line is a return loss of the antenna in other approaches during normal operation, and a dashed line is a return loss of the antenna in the other approaches when the antenna is touched by a user. It can be seen from FIG. 4 that the return loss of the antenna during normal operation has standing waves both in a low frequency band and a high frequency band, and when the user touches a frame formed by a radiator of the antenna, the return loss already does not have a standing wave in the high frequency band, that is, the frequency is completely shifted out. Again, as shown in FIG. 5, a dashed line is a return loss of the antenna in the other approaches when the antenna is touched by a user, and a solid line is a return loss of an antenna 100 in this embodiment when the antenna 100 is touched by the user. It can be seen from FIG. 5 that, in the mobile terminal provided in this embodiment, when a human body touches a coupling part 110a of an outer frame formed by a first radiator 110 of the antenna 100, due to a frequency shift effect of a second radiator 120, in a high frequency band, for example, a GPS frequency band, there still exists a standing wave.

Figure 6:
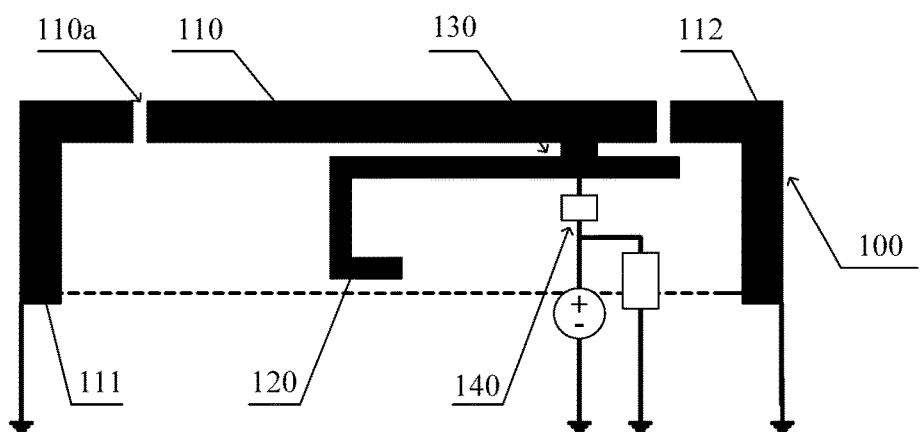
FIG. 6 is a schematic structural diagram of another mobile terminal according to an embodiment of the present disclosure.
Figure 7:
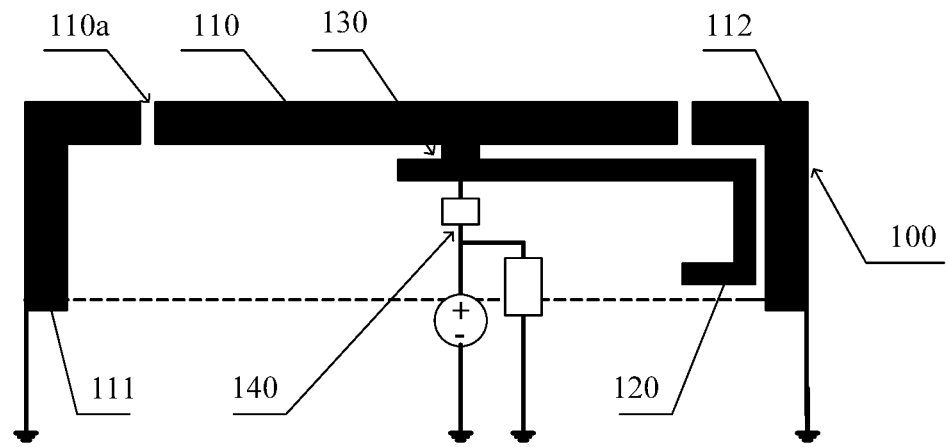
FIG. 7 is a schematic structural diagram of still another mobile terminal according to an embodiment of the present disclosure.
Figure 8:
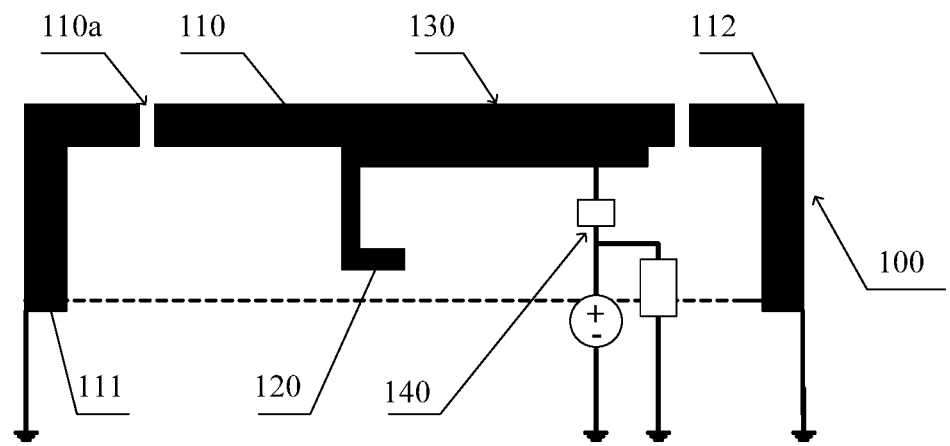
FIG. 8 is a schematic structural diagram of yet another mobile terminal according to an embodiment of the present disclosure.

In the mobile terminal provided in this embodiment of the present disclosure, the first radiator 110 and the second radiator 120 of the antenna 100 are electrically connected radiators. Optionally, a feeding part 130 formed by the first radiator 110 and the second radiator 120 in this embodiment may be a coupled feeder or a direct feeder. Referring to FIG. 2, the feeding part 130 of the antenna provided in the embodiment shown in FIG. 2 is a coupled feeder. FIG. 6 is a schematic structural diagram of another mobile terminal according to an embodiment of the present disclosure, FIG. 7 is a schematic structural diagram of still another mobile terminal according to an embodiment of the present disclosure, and the feeding parts 130 of the antennas provided in the embodiments shown in FIG. 6 and FIG. 7 are direct feeders. Further, if the coupled feeder shown in FIG. 2 is formed, a spacing between the first radiator 110 and the second radiator 120 needs to be shorter than 1 millimeter, and a dielectric constant of a filling dielectric is between 2 and 6. Further, a coupling area may be maximized within a design range in order to ensure a coupling effect of the first radiator 110 and the second radiator 120. If the direct feeder shown in FIG. 6 or FIG. 7 is formed, on a basis of a design requirement of the foregoing coupled feeder for the first radiator 110 and the second radiator 120, the first radiator 110 and the second radiator 120 may also be directly connected using a metal wire in order to enhance an electrical connection effect of the radiators. It should be noted that, as shown in FIG. 6 and FIG. 7, this embodiment is not limited to a direction of the second radiator 120 inside an outer frame formed by the first radiator 110 and a ground branch. In another possible implementation manner of this embodiment, as shown in FIG. 8, FIG. 8 is a schematic structural diagram of yet another mobile terminal according to an embodiment of the present disclosure. A feeding part 130 of an antenna 100 in the mobile terminal provided in this embodiment is also a direct feeder. Different from two radiators connected using a metal wire in the embodiments shown in FIG. 6 and FIG. 7, in a feeder structure formed in this embodiment, a part of a first radiator 110 and a part of a second radiator 120 are directly connected and may achieve a same feeding effect.

It should be noted that a feed of the antenna 100 may supply signal to the first radiator 110 and the second radiator 120 at the same time, that is, the first radiator 110 and the second radiator 120 are parallel radiators.

Further, in the mobile terminal provided in this application, the antenna 100 further includes a matching circuit 140 that separately connects to the first radiator 110 and the second radiator 120, where the matching circuit 140 generally includes a capacitor and an inductor and is configured to adjust input impedance of the first radiator 110 and the second radiator 120. Further, one end of the matching circuit 140 is connected to the first radiator 110 and the second radiator 120, and the other end of the matching circuit 140 is connected to a radio frequency end of the mobile terminal such that impedance of the radiators of the antenna 100 and impedance of the radio frequency end achieve conjugate matching.

Figure 9:
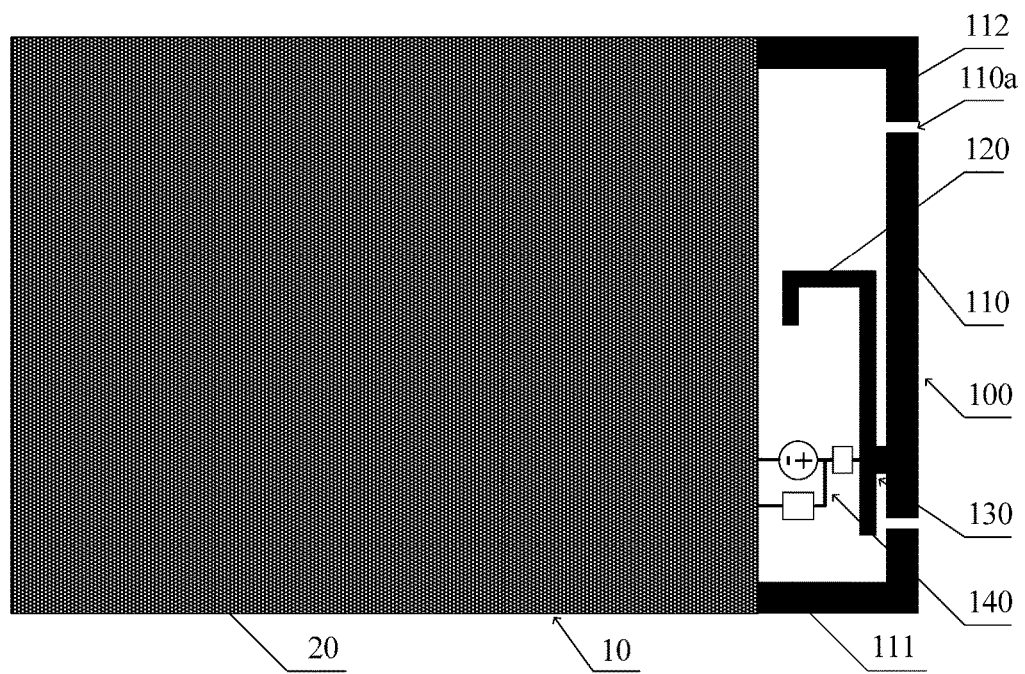
FIG. 9 is a schematic structural diagram of still yet another mobile terminal according to an embodiment of the present disclosure.

FIG. 9 is a schematic structural diagram of still yet another mobile terminal according to an embodiment of the present disclosure. As shown in FIG. 9, on a basis of the mobile terminals provided in the embodiments shown in FIG. 1, FIG. 2, FIG. 6, FIG. 7, and FIG. 8, the mobile terminal 10 provided in this embodiment further includes a metal rear cover 20 and a mainboard (not shown in FIG. 9), where a grounding surface is disposed on the mainboard, where the metal rear cover 20 is connected to the grounding surface of the mainboard, and a first radiator 110 and a second radiator 120 are directly connected to the mainboard using the matching circuit 140. The embodiment shown in FIG. 9 is shown using an example in which a feeding part 130, formed by the first radiator 110 and the second radiator 120, is a direct feeder. Further, one end of a first ground branch 111 and one end of a second ground branch 112 are respectively connected to two sides of the metal rear cover 20, a nonmetallic material is separately filled between the first radiator 110 and the first ground branch 111 and between the first radiator 110 and the second ground branch 112 such that the metal rear cover 20, the first ground branch 111, the second ground branch 112, and the first radiator 110 form an integrated metal housing of the mobile terminal 10. The metal housing with an overall effect in this embodiment meets a requirement of a user for an appearance of a mobile terminal and has a relatively good market prospect.

In the mobile terminal provided in this embodiment, a specific operating process of the antenna 100 includes that a signal is transmitted from the mainboard. After passing through the matching circuit 140, the signal enters the radiators of the antenna 100, that is, the first radiator 110 and the second radiator 120. Then, the signal is coupled to the first ground branch 111 and the second ground branch 112 at the two ends of the first radiator 110, because the two ground branches 111 and 112 are connected to the metal housing 20 and the metal housing 20 is connected to the grounding surface of the mainboard, the signal returns to the mainboard to form a close path of a power line, and an unclosed magnetic line is formed in space. Mutual conversion occurs between an electric field and a magnetic field, which forms radiation in order to achieve a purpose of communication.

It should be noted that only an antenna part of a mobile terminal is shown in the mobile terminals provided in the embodiments shown in FIG. 1, FIG. 2, FIG. 6, FIG. 7, and FIG. 8. A design solution of the antenna in the mobile terminal provided in the embodiment shown in FIG. 9 is the same as that of the antennas in the foregoing embodiments. Therefore, in the mobile terminal provided in this embodiment, use performance and beneficial effects of the antenna are the same as those in the foregoing embodiments, and details are not described herein again.

Optionally, in the mobile terminal provided in this embodiment, the first radiator 110, the first ground branch 111, and the second ground branch 112 may be disposed at the top or bottom of the mobile terminal 10, and one end of the second radiator 120 is close to an inner side of the metal rear cover 20 or the grounding surface of the mainboard.

According to the mobile terminal 10 provided in this embodiment, its design structure not only has an integral metal housing, but also has a good radiation effect. Because a second radiator 120 with a relatively high resonance frequency band is disposed inside the metal outer frame, a problem that a signal is degraded after a user touches a first radiator 110 in the metal outer frame is prevented effectively.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. An antenna for a mobile terminal, comprising:
a first radiator;

a second radiator configured to form an electrical connection with the first radiator;
a first ground branch configured to form a first coupling part with one end of the first radiator; and
a second ground branch configured to form a second coupling part with the other end of the first radiator,
wherein the first radiator, the first ground branch, and the second ground branch form an outer frame of the mobile terminal,
wherein the second radiator encircles an inner side of the outer frame formed by the first radiator, the first ground branch, and the second ground branch,
wherein the first radiator is configured to generate a first resonance and the second radiator is configured to generate a second resonance in different frequency bands,
wherein the mobile terminal comprises a mainboard and a metal rear cover connected to a grounding surface of the mainboard, and wherein the first radiator and the second radiator are directly connected to the mainboard.

2. The antenna according to claim 1, wherein the first radiator operates in a normal operating frequency band when performing communication, wherein the second radiator operates in a frequency band higher than the normal operating frequency band, and wherein a frequency of the second radiator is shifted to the normal operating frequency band when a coupling part formed by the first radiator and one of the ground branches is touched by a user such that the second radiator takes the place of the first radiator to perform the communication.

3. The antenna according to claim 2, wherein the normal operating frequency of the first radiator ranges from about 791 megahertz (MHz) to about 961 MHz, and wherein the frequency band in which the second radiator operates ranges from about 1710 MHz to about 2690 MHz.

4. The antenna according to claim 1, wherein an electrical connection area between the first radiator and the second radiator forms a feeding part of the antenna, wherein the feeding part is a coupled feeder, wherein a spacing between the first radiator and the second radiator is shorter than 1 millimeter, and wherein a dielectric constant of a filling dielectric from 2 to 6.

5. The antenna according to claim 1, wherein an electrical connection area between the first radiator and the second radiator forms a feeding part of the antenna, wherein the feeding part is a direct feeder, wherein a spacing between the first radiator and the second radiator is shorter than 1 millimeter, wherein a dielectric constant of a filling dielectric from 2 to 6, and wherein the first radiator and the second radiator are directly connected.

6. The antenna according to claim 1, further comprising a matching circuit, wherein the matching circuit comprises a capacitor and an inductor, and wherein the matching circuit is separately connected to the first radiator and the second radiator and is configured to adjust input impedance of the first radiator and the second radiator.

7. The antenna according to claim 1, wherein the first radiator and the second radiator are parallel radiators.

8. The antenna according to claim 1, wherein a part of the first radiator is directly connected to a part of the second radiator.

9. The antenna according to claim 1, further comprising a matching circuit used to directly connect the first radiator and the second radiator to the mainboard.

10. The antenna according to claim 1, wherein the first radiator and the second cover are configured such that the antenna covers a frequency band ranging from about 791 megahertz (MHz) to about 2690 MHz.

11. A mobile terminal comprising:
an antenna comprising:
a first radiator;
a second radiator configured to form an electrical connection with the first radiator;
a first ground branch configured to form a first coupling part with one end of the first radiator;
a second ground branch configured to form a second coupling part with the other end of the first radiator; and
a matching circuit comprising a capacitor and an inductor,
wherein the first radiator, the first ground branch, and the second ground branch form an outer frame of the mobile terminal,
wherein the second radiator encircles an inner side of the outer frame formed by the first radiator, the first ground branch, and the second ground branch,
wherein the first radiator is configured to generate a first resonance and the second radiator is configured to generate a second resonance in different frequency bands, and
wherein the matching circuit is separately connected to the first radiator and the second radiator and is configured to adjust input impedance of the first radiator and the second radiator;
a metal rear cover; and
a mainboard,
wherein a grounding surface is disposed on the mainboard,
wherein the metal rear cover is connected to the grounding surface of the mainboard, and
wherein the first radiator and the second radiator are directly connected to the mainboard using the matching circuit.

12. The mobile terminal according to claim 11, wherein the first radiator operates in a normal operating frequency band when performing communication, wherein the second radiator operates in a frequency band higher than the normal operating frequency band, and wherein a frequency of the second radiator is shifted to the normal operating frequency band when a coupling part formed by the first radiator and one of the ground branches is touched by a user such that the second radiator takes the place of the first radiator to perform the communication.

13. The mobile terminal according to claim 11, wherein an electrical connection area between the first radiator and the second radiator forms a feeding part of the antenna, wherein the feeding part is a coupled feeder, wherein a spacing between the first radiator and the second radiator is shorter than 1 millimeter, and wherein a dielectric constant of a filling dielectric from 2 to 6.

14. The mobile terminal according to claim 11, wherein an electrical connection area between the first radiator and the second radiator forms a feeding part of the antenna, wherein the feeding part is a direct feeder, wherein a spacing between the first radiator and the second radiator is shorter than 1 millimeter, wherein a dielectric constant of a filling dielectric from 2 to 6, and wherein the first radiator and the second radiator are directly connected.

15. The mobile terminal according to claim 11, wherein the first radiator and the second radiator are parallel radiators.

16. The mobile terminal according to claim 11, wherein the first radiator, the first ground branch, and the second ground branch are disposed at a top of the mobile terminal.

17. The mobile terminal according to claim 11, wherein the first radiator, the first ground branch, and the second ground branch are disposed at a bottom of the mobile terminal.

18. The mobile terminal according to claim 11, wherein one end of the second radiator is close to an inner side of the metal rear cover.

19. The mobile terminal according to claim 11, wherein one end of the second radiator is close to the grounding surface of the mainboard.

20. A mobile terminal comprising:
a mainboard;
a grounding surface disposed on the mainboard;
a metal rear cover connected to the grounding surface of the mainboard; and
an antenna comprising:
  a first radiator;
  a second radiator configured to form an electrical connection with the first radiator, wherein the first radiator and the second radiator are directly connected to the mainboard;
  a first ground branch configured to form a first coupling part with one end of the first radiator; and
  a second ground branch configured to form a second coupling part with the other end of the first radiator, wherein the first radiator, the first ground branch, and the second ground branch form an outer frame of the mobile terminal,
wherein the second radiator encircles an inner side of the outer frame formed by the first radiator, the first ground branch, and the second ground branch, and
wherein the first radiator is configured to generate a first resonance and the second radiator is configured to generate a second resonance in different frequency bands.

* * * * *

UNITED STATES PATENT AND TRADEMARK OFFICE
CERTIFICATE OF CORRECTION

PATENT NO. : 10,347,969 B2  
APPLICATION NO. : 15/326678  
DATED : January 17, 2017  
INVENTOR(S) : Yuanpeng Li et al.

Page 1 of 1

It is certified that error appears in the above-identified patent and that said Letters Patent is hereby corrected as shown below:

On the Title Page

Item (54) and in the Specification at Column 1, Lines 1-2: should read "A MOBILE TERMINAL WITH AN ANTENNA HAVING MULTIPLE RADIATORS"

Page (2), Item (56), U.S. PATENT DOCUMENTS: should read "2015/0255857 A1* 9/2015 Kim et al."

Signed and Sealed this  
Third Day of September, 2019

Andrei Iancu  
*Director of the United States Patent and Trademark Office*